Sept. 10, 1957 H. R. HUDSON ET AL 2,805,552

PRE-SELECTOR DIAL DEVICES

Filed May 9, 1955 4 Sheets-Sheet 1

INVENTOR.
HOLLAND R. HUDSON
BY CARL F. PABST
Zugelter & Zugelter
Attys.

INVENTOR.
HOLLAND R. HUDSON
CARL F. PABST
BY Zugelter & Zugelter
Attys.

INVENTOR.
HOLLAND R. HUDSON
CARL F. PABST
BY Zugelter & Zugelter
Attys.

Sept. 10, 1957 H. R. HUDSON ET AL 2,805,552

PRE-SELECTOR DIAL DEVICES

Filed May 9, 1955 4 Sheets-Sheet 4

INVENTOR.
HOLLAND R. HUDSON
BY CARL F. PABST
Zugelter & Zugelter
Attys.

2,805,552
Patented Sept. 10, 1957

2,805,552

PRE-SELECTOR DIAL DEVICES

Holland R. Hudson and Carl F. Pabst, Cincinnati, Ohio, assignors to The Lodge & Shipley Company, Cincinnati, Ohio, a corporation of Ohio Application May 9, 1955, Serial No. 506,844

6 Claims. (Cl. 60—97)

This invention relates to devices for preselecting the operation of a machine or other device.

Specifically, the invention relates to a device embodying coaxially arranged, concentric dial members mounted for limited rotary movement relative to one another, a disk coaxial to the dial members and movable with one of said dials, and means cooperating with the disk and operated by the disk for actuating some or all of a plurality of control members. For example the device may be applied to lathes for automatically preselecting the operation of various gear shifts associated with the spindle drive transmission to provide the proper or the closest proper spindle speed for a given diameter of work and selected cutting speed.

An object of this invention is to provide a device which includes relatively rotatable concentric dials, a disk member operated in response to rotation of one of the dials, and control means operated by the disk whereby the disk may be positioned in various predetermined positions resulting from the selective rotation of the dials, and preselected ones of a plurality of control devices may be selected and conditioned for operation.

The foregoing and other objects and advantages of the invention will be apparent to those of ordinary skill in the art to which the invention pertains from the following description and the accompanying drawings.

Figure 1:
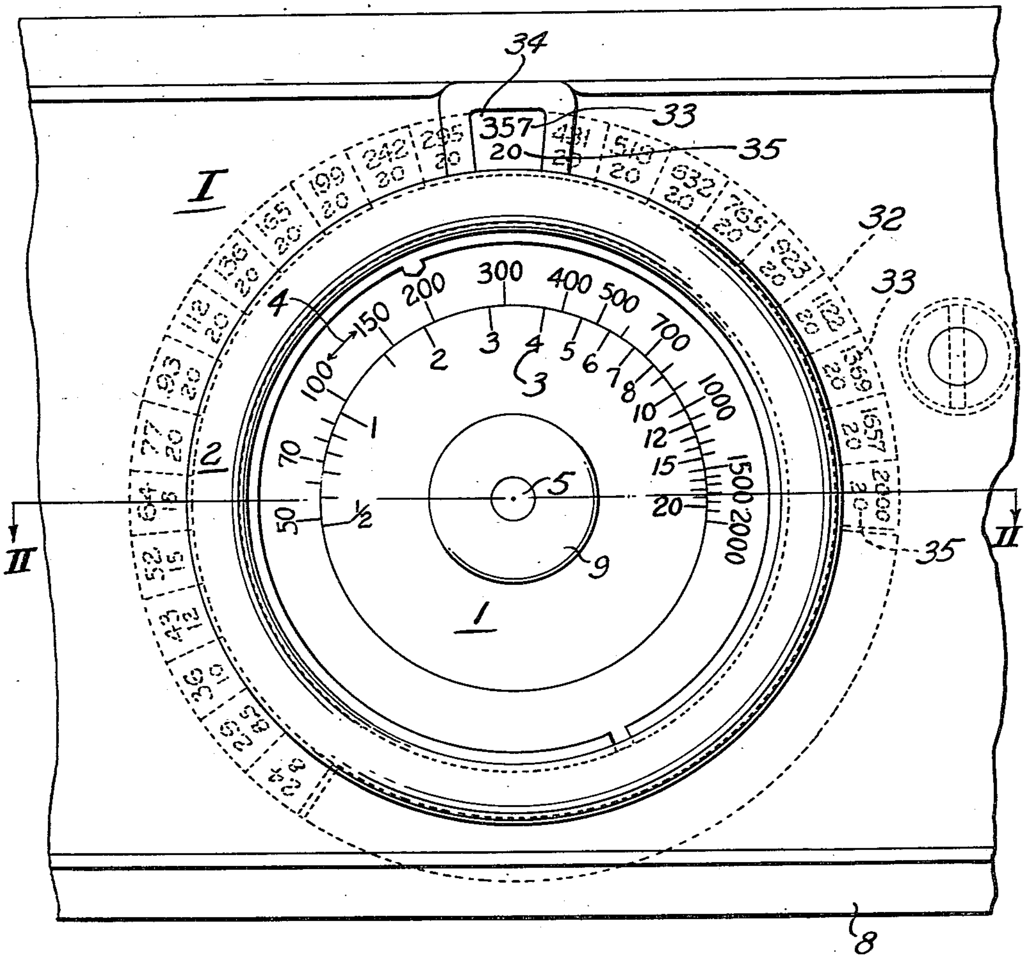
Figure 1 is a view in front elevation of a device embodying a form of the invention.
Figure 2:
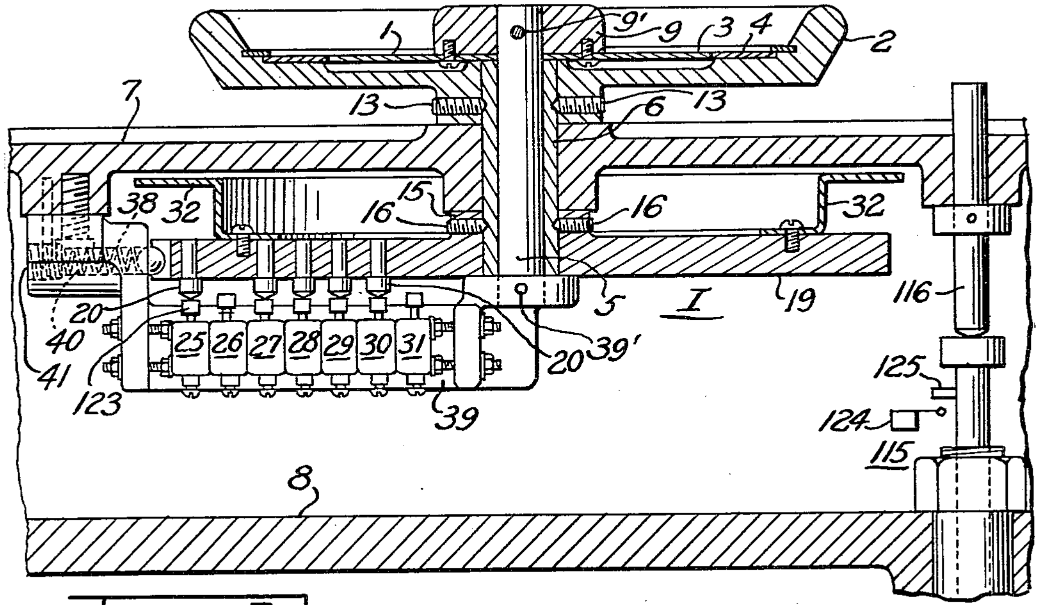
Fig. 2 is a view in vertical section of a portion of the headstock of a lathe having thereon the device shown in Fig. 1, the device of Fig. 2 being in section taken on line II—II of Fig. 1.
Figure 3:
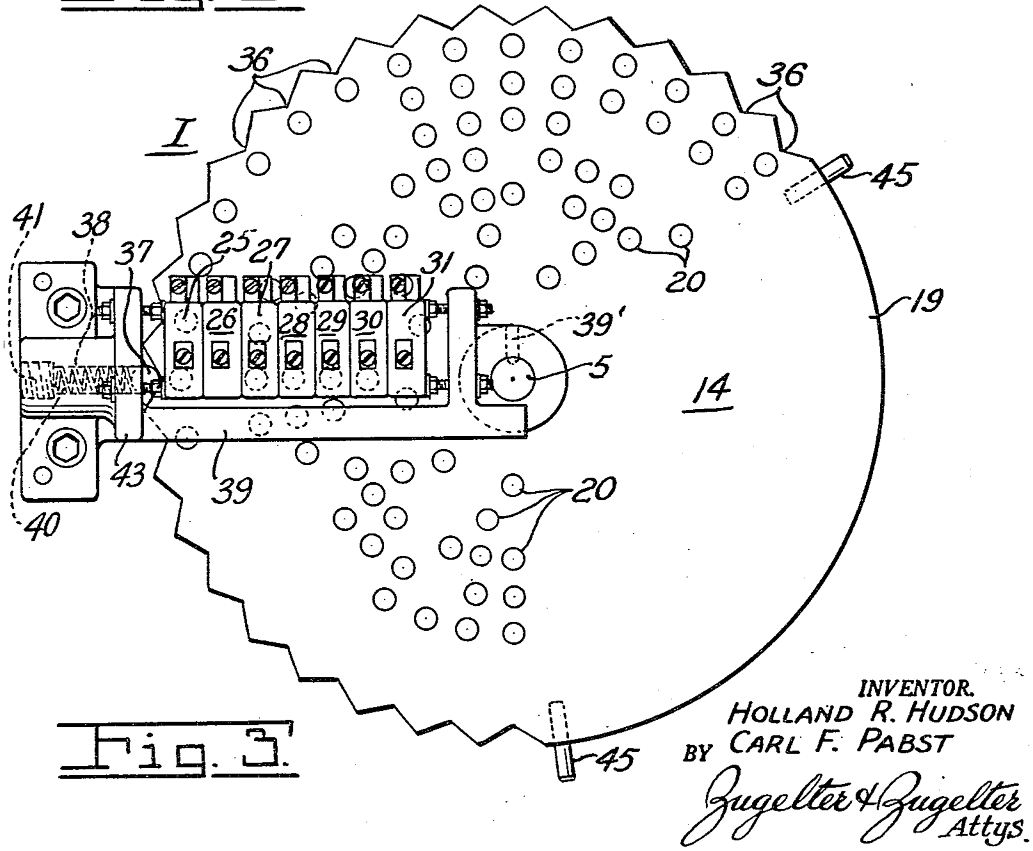
Fig. 3 is a rear view in elevation of a disk embodied in the device illustrated in Figs. 1 and 2.

In Figs. 1, 2 and 3 a preselecting device I is illustrated that comprises relatively rotatable dial members 1 and 2 having concentric scales 3 and 4 respectively. As shown in Fig. 1, scales 3 and 4 are calibrated logarithmically to the same scale of units. Scale 3 may represent one quantity and scale 4 another. For example, if the device is used to preselect the gear shifts to be operated in the transmission of the drive to the spindle of a lathe, scale 3 may represent the diameter of the work piece in inches or other units and scale 4 the cutting speed as in feet per minute.

Dial member 1 is secured to a shaft 5 mounted in a bushing 6 rotatable in a face plate 7 adapted to be secured to the headstock 8 of a lathe for example. The dial member 1 is secured to a knob 9 attached to the shaft 5 by means of a pin 9'. As will be shown infra, shaft 5 is stationary.

The dial member 2 is like a handwheel and is mounted on and secured to the bushing 6 with set screws 13. The inner end of the bushing 6 carries a preselector disk 14 having a hub 15 secured by screws 16 to the bushing. Disk 14 is relatively thick and is adapted for rotary motion on and about the shaft 5 as an axis, to an extent less than one complete revolution in either direction. The rear face 19 of disk 14 is shown in Fig. 3, and is provided with a plurality of knobs 20 in the form of pointed plugs that are inserted in apertures extending in the direction of the said axis and through the disk at predetermined locations depending on the pre-selector pattern desired.

As can be seen in Fig. 3, the plugs or knobs 20 are arranged in groups, each group being located on separate radial lines which are preferably uniformly spaced, that is, the angular spacing between adjacent rows of plugs disposed in such radial lines is the same in degrees as the spacing between any other pair of adjacent radial lines of plugs. It is also to be observed that the number and spacings of the plugs or knobs 20 in any radial line differs from the number and spacing of plugs in other radial lines according to the pre-selector pattern required.

The plugs or knobs 20 are disposed to actuate a plurality of control members 25 through 31 respectively. The control members as illustrated may be electric switches for controlling the solenoids of various valves, as will be shown infra. The selector is so constructed that when there are seven switches available for operation for example, twenty-four different combinations of switches may be selected and operated as the disk is rotated through an angle of approximately 225°. The larger the number of switches, and the larger the number of radial lines and plugs 20, the greater will be the possible combinations of switches that can be operated.

The disk 14 is provided with a dial 32 having a scale 33 thereon which is graduated into units of spindle speed in R. P. M. The selected R. P. M. spindle speed for a given work piece diameter and cutting speed is visible through a window 34 in the panel 7.

The scales 3 and 4 are logarithmic. Similarly the scale 33 is calibrated logrithmically to the same scale of units as are employed in scales 3 and 4. However, numbers are inserted which indicate the exact or closest available spindle speed for a given setting of scale 4 with respect to scale 3. If a work piece has a diameter of eleven inches and the cutting speed desired is 1028 feet per minute, dial 2 is rotated until the 1028 unit mark on scale 4 registers with the 11 unit mark on scale 3. When so registering, the R. P. M. of the spindle appears in the window as 357. The scale 33 may also be provided with a scale 35 graduated in units of horsepower for indicating the required horsepower for the selected cutting speed, work piece diameter and spindle speed.

When particular values of cutting speed in feet per minute and the diameter of the work piece in inches are aligned on scales 3 and 4, the R. P. M. dial and disk 14 may not be exactly aligned in any of the 24 possible selected positions. To make certain that the R. P. M. dial will come to rest in a position corresponding to the closest available R. P. M. speed of the spindle, means are provided for automatically shifting the disk 14 to the nearest spindle speed position. The means provided for accomplishing this purpose includes a plurality of notches 36 uniformly disposed around the perimeter or edge of the disk 14 and a spring pressed ball 37. The ball operates in a bore 38, in a bracket 39 that supports the control members 25 through 31. The bracket is supported at one end by the plate 7 and the other is supported by and secured by a set screw 39' to the inner end of shaft 5. Thus shaft 5 is held in a stationary position. The ball 37 is urged against the edge of the disk by a spring 40 which is held in compression by a screw plug 41. Thus when the disk comes to a position where the ball is near the top of one of these notches, the pressure of the ball on the sides of the notches will cause the disk 14 to move enough to allow the ball to seat in the bottom of the notch. Thus the disk comes automatically to the closest available R. P. M. position of the selector.

An important feature of the selector arrangement shown lies in the fact that not only will the values on the open faced dials 3 and 4 be correct, at positions directly below the window 34, wherein the R. P. M. values appear, but also at any angular position about the dials. For example, a cutting speed of 150 feet per minute for a work piece of 1.61 inches in diameter; a cutting speed of 500 feet per minute for a work piece diameter of 5.36 inches; a 700 feet per minute cutting speed and a seven and one half inches diameter work piece and a 1400 feet per minute cutting speed and a 15-inch diameter work piece will all have a correct spindle speed of 356 R. P. M.'s.

When dials 1 and 2 have been relatively adjusted according to work piece diameter and cutting speed, disk 14 will have been so positioned that the required spindle speed is selected through the actuation of certain of the control members in the group 25 to 31. By that is meant that only a selected number of the control members in a selected combination will be actuated and preset. In this case electric circuits will be preset to accomplish the function of shifting gears in the transmission to provide the spindle speed indicated in window 34.

In order to limit the rotational travel of the disk 14 to a maximum of approximately 230°, the disk 14 is provided with pins 45 disposed to engage the top or bottom of flange 43 of the bracket 39. Thus the disk 14 may be rotated in either direction on shaft 5 until one of the pins 45 engages against the flange 43.

The device I may be employed for many purposes where a preselection of operation of various and sundry devices is required. The particular device illustrated is particularly adapted for controlling, for example, the gear shifts of the transmission for the drive of a lathe spindle. In Figures 4 to 7 inclusive apparatus is illustrated more or less diagrammatically, the operation of which can be preselected by means of device I to effect that combination of gears in the transmission which will give the spindle speed selected.

The apparatus illustrated in Figs. 4 to 7 inclusive is intended to be illustrative only and not as a limitation. It is to be observed that only six of the disk actuated switches are used in Fig. 4, although seven disk actuated switches are shown in Fig. 2.

Figure 4:
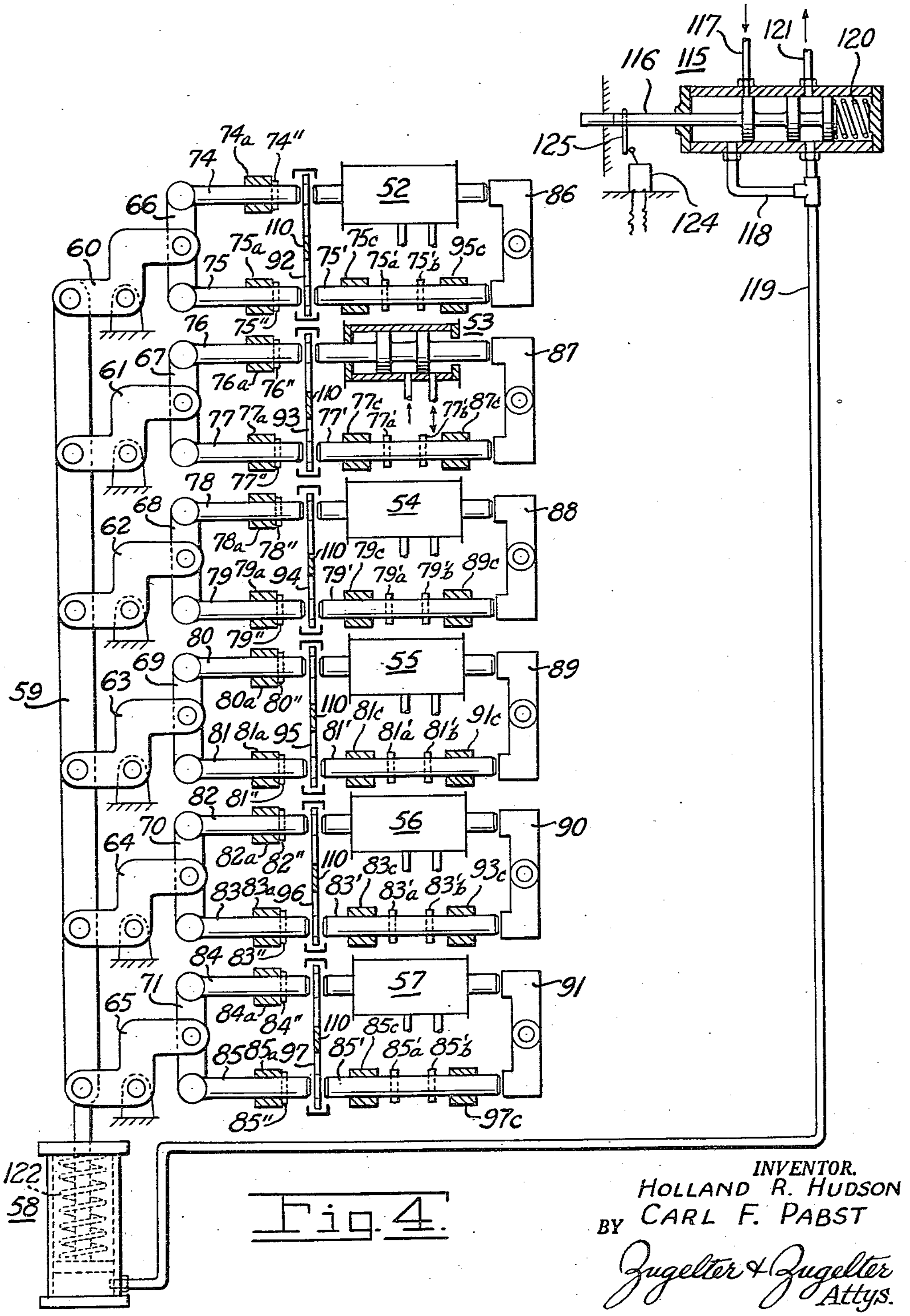
Fig. 4 is a more or less diagrammatic view of apparatus adapted to be preselectively controlled by the device shown by Figs. 1, 2 and 3.

In gear shift mechanisms as employed on modern lathes, the shifting of the gears is effected by power cylinders operated by hydraulic fluid. The cylinders are controlled by valves which when in one position deliver fluid pressure to the pistons of the hydraulic cylinders causing them to move and shift gears, and when the valve is actuated to another position the hydraulic fluid is exhausted from its associated power cylinder and the piston returns to its initial position under pressure. In Figure 4, the apparatus includes a plurality of valves that supply hydraulic fluid to, and exhaust hydraulic fluid from gear shift cylinders not shown. These valves are designated by reference characters 52 through 57 and are arranged to be actuated by a power cylinder 58 that operates a link 59 to which bellcranks 60 through 65 both inclusive, are pivotally connected. The bellcranks in turn are connected to single trees 66 through 71, to the ends of which plungers or pins 74 through 85, respectively, are connected. The even numbered pins 74, 76, 78, 80, 82 and 84 are disposed to actuate the valves 52 through 57 to their on positions, that is, to the positions in which hydraulic fluid is supplied to the power cylinders (not shown). The valves are returned to their exhaust positions by means of the odd numbered pins 75–85, slide rods or pins 75', 77', 79', 81', 83' and 85' and levers 86 through 91 respectively.

To ensure that the pins which are pivotally connected to the single trees 66 through 71 will always come to a definite position with reference to each other when the piston in power cylinder 58 has been returned to its initial position the pins 74 through 85 are provided with stops 74'' through 85'' that engage the pin bearings 74a through 85a respectively. The slide pins 75', 77', 79', 81', 83' and 85' are also provided with stops 75'a and *b*, 77'a and *b*, 79'a and *b*, 81'a and *b*, 83'a and *b*, and 85'a and *b* respectively as shown in Fig. 4. The stops on the pins 75', 77', 79', 81', 83' and 85' serve to limit the motion of these pins between their slide bearings 75c, 77c, 79c, 81c, 83c, 85c, 95c, 87c, 89c, 91c, 93c and 97c.

In order that the valves 52 through 57 may be preselected in any required combination of valves, the respective valve operating mechanisms are provided with barriers 92 through 97. When these barriers are in one position the even numbered pins 74 through 84 are rendered operative to actuate the valves to their fluid transmitting position and when the barriers are in another position the valves are actuated by the odd numbered pins 75 through 85 to their off positions. The selector mechanism of Figs. 1, 2 and 3 makes it possible to control which of the barriers and how many shall be in one or the other of these positions.

In order to actuate the barriers 92 through 97 each barrier is provided with a solenoid, the solenoids being designated by reference characters 100 through 105 respectively. Each of the solenoids is provided with a core 107 which is urged out of the field of the solenoid by a spring 108. The upward travel of the core is limited by an adjustable stop 109. Each core is connected to its associated barrier by a link 110.

Figures 5, 6, 7:
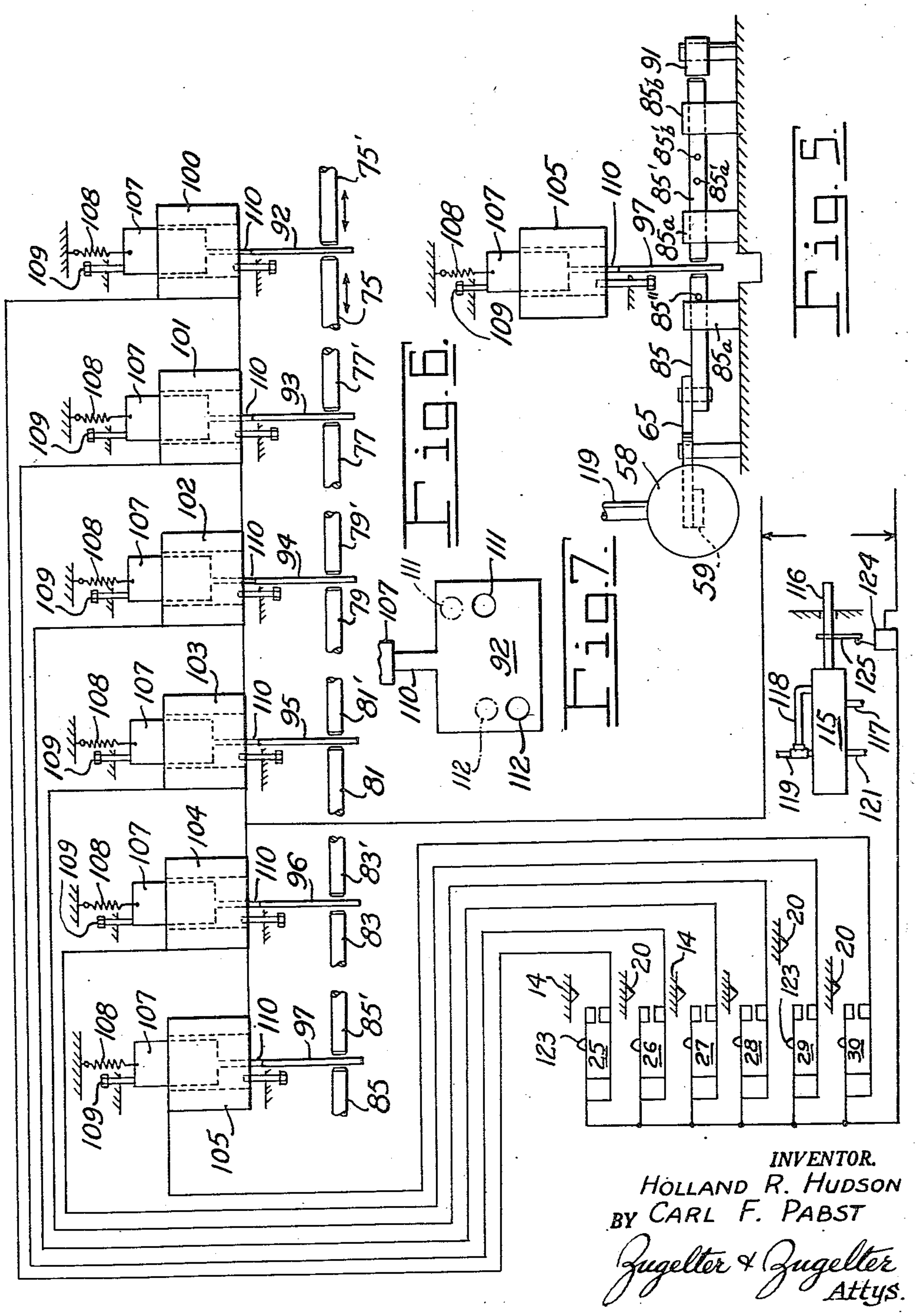
Fig. 5 is an end view of the apparatus shown in Fig. 4.
Fig. 6 is a more or less diagrammatic view of the apparatus shown in Fig. 4, illustrating electrical devices such as solenoids and the circuits therefor which are controlled by the disk shown in Fig. 3.
Fig. 7 is a view in side elevation of an element embodied in the apparatus illustrated in Figs. 4 and 6.

As shown in Fig. 7 each of the barriers 92 through 97 is provided with a pair of apertures 111 and 112. When the solenoid associated with any one barrier is energized, the barrier is lowered to a point where the aperture 111 registers with its associated even numbered pin in the group of pins 74–85. When the plate or barrier is in its uppermost position corresponding as when the solenoid is deenergized, the aperture 112 will be in a position to register with an odd numbered pin of the group of pins 75 through 85.

If it be assumed that the dial mechanism I has been operated to a position calling for a given spindle speed and that for that particular spindle speed valves 57, 55 and 52 are to be actuated to their on positions, then solenoids 105, 103 and 100 will be energized and barriers 97, 95 and 92 lowered. Thus when the cylinder 58 (Fig. 4) is supplied with motive fluid its piston will move upwardly, moving link 59 upwardly and turning the bellcranks 60 through 65 on their bearings. The turning of the bellcranks operates to move the even and odd numbered pins associated with the single trees 66–71 towards the barriers. But since barriers 97, 95 and 92 will be in their lowermost positions, the apertures 111 will be aligned with pins 84, 80 and 74 but the apertures 112 will be out of register with pins 85, 81 and 75. Therefore as these pins move to the right or inwardly towards the barrier, the pins 85, 81 and 75 will strike their barriers, these barriers then providing reaction points causing the single trees 71, 69 and 66 to pivot clockwise on the bellcranks and causing the pins 84, 80 and 74 to pass through their apertures 111 in barriers 97, 95 and 92 into engagement with the valve stems of valves 57, 55 and 52. These valves will then be actuated to their on positions, that is to the positions in which hydraulic motive fluid is supplied to the gear shift power cylinders controlled thereby. The single trees 70, 68 and 67 when moved forwardly by their associated bellcranks will cause the pins 82, 78 and 76 to strike their associated barriers which provide reaction points and causes the single trees to turn counterclockwise thereby actuating the pins 83, 79 and 77 through the respective barrier apertures 112 into engagement with the pins 83′, 79′ and 77′. The pins 83′, 79′ and 77′ are then actuated into engagement with the levers 90, 88 and 87 causing them to turn counterclockwise and engage the valve stems of valves 56, 54 and 53 and actuate those valves to off position, that is, the position in which hydraulic motive fluid is exhausted from the shift cylinders associated therewith.

The cylinder 58 is actuated or controlled by a shift valve 115 having a plunger 116 that extends through the face of the panel 7. When that plunger is pushed inwardly, the valve 115 is actuated to a position in which motive fluid is supplied from a supply line 117 through the valve and pipes 118 and 119 to the power cylinder. When the plunger 116 is released, a spring 120 returns the valve to its initial position in which position the motive fluid exhausts from line 119 through exhaust or drain line 121. When fluid pressure is relieved from the cylinder 58 the piston is returned by a spring 122.

Figure 6 also shows schematically the face 19 of disk 14 and switches 25 through 30, switch 31 shown in Fig. 2 having been omitted. The switches 25 through 30 are normally open and are closed when engaged by a knob 20 on disk 14. Thus, if it be assumed that the disk 14 is moving from right to left in Fig. 6, it will be observed that switches 25, 26, 27, 28 and 30 will be closed at the same time the moment that knobs or plugs 20 engage buttons 123 on the switches. If the disk is moved still farther to the left, switches 25, 26, 27, 28 and 30 will be opened but switch 29 will be closed when knob 20 engages the button 123 of switch 29. In order to avoid having voltage on the selected solenoids before the shift valve 115 is moved to shift position, a switch 124 is provided that is engaged by a finger 125 on the plunger of valve 115. In the first portion of the motion of the valve towards its shift position, the switch 124 is closed, thereby supplying the switches 25 through 30 with voltage so that at any time that one or more of them are closed, voltage will be supplied to the particular solenoid in circuit with each of the closed switches and the barriers of the energized solenoids will be pulled into position between the pins shown in Fig. 6 as well as in Fig. 4.

From the foregoing description it will be readily apparent to those of ordinary skill in this art that the selector dial mechanism I may be applied to the control of various devices where various combinations of operation of the devices is desired and where it is important to preselect the operation in advance. Having thus described the invention what we claim as new and desire to be secured by Letters Patent is:

1. In a device of the class described, the combination of a stationary shaft constituting an axis to which other parts of the device are operatively related, support means for the shaft, a scaled dial coaxial with the shaft and immovable in relation to the shaft, a bushing about the shaft for movement on the shaft as a bearing, a second scaled dial, the second dial mounted on and for movement with the bushing and adapted for manually moving the bushing in rotary direction on the shaft, a flat disk mounted on and for movement with the bushing, a third scaled dial, the third scaled dial being disposed on one side of the flat disk, mounted in fixed relation to the flat disk and movable with the disk, the said three scaled dials being adapted to collectively indicate various selected working conditions and arrangements for which the device is adapted, a multiple series of spaced knobs mounted on the disk, and all of said knobs projecting from and beyond the same side of the disk and disposed on the opposite side of the disk in relation to said third scaled dial, each series of knobs being aligned radially of the disk, and each series of knobs varying in the spaced relation of the knobs from the axis about which the disk is adapted to be actuated, a bracket fixed in relation to said axis and extending approximately radially of the disk and disposed at the side of the disk from which the knobs project, a series of electric contact switches carried by the bracket and aligned radially in relation to the disk and adapted to be engaged by the knobs in each of the series of knobs as the disk is moved about its axis, whereby various of the electric switches are actuated in various distinct combinations determined by the specific rows of radially aligned knobs as such rows of knobs are brought into position for contacting selected groupings of the electric switches, a series of separate electrical circuits each including one of said electric switches and a separate means to be electrically actuated in response to the inclusion and non-inclusion of said means in closed and open conditions of its respective electric circuit, a series of hydraulically operating control mechanisms, one such hydraulically operating control mechanism being provided for each electric switch, a variable pressure hydraulic circuit for each of said hydraulically operating control mechanisms adapted to operate upon a mechanism to be conditioned and actuated by pressure variations in its respective hydraulic circuit, and a common mechanical means operable for modifying the positions and conditions of the several hydraulically operating control mechanisms in conformity with the selection of the electric switches actuated from a selected series of knobs on said flat disk.

2. A device as in claim 1 and means for yieldingly retaining the flat disk in various adjusted positions in relation to the bracket and the electric contact switches carried by the bracket.

3. A device as in claim 1, including means for yieldingly retaining the flat disk in various adjusted positions in relation to the bracket and the electric contact switches carried by the bracket, and a single means comprising separate hydraulically operating means for initiating operation of the common mechanical means and an electrical circuit and an electric switch adapted for operation from said single means for establishing open and closed electrical circuit conditions to and through the electric switches mounted on the bracket.

4. In a device of the class described, the combination of a stationary shaft constituting an axis to which other parts of the device are operatively related, support means for the shaft, a scaled dial coaxial with the shaft and immovable in relation to the shaft, a bushing about the shaft for movement on the shaft as a bearing, a second scaled dial, the second dial mounted on and for movement with the bushing and adapted for manually moving the bushing in rotary direction on the shaft, a flat disk mounted on and for movement with the bushing, a third scaled dial, the third scaled dial being disposed on one side of the flat disk, mounted in fixed relation to the flat disk and movable with the disk, the said three scaled dials being adapted to collectively indicate various selected working conditions and arrangements for which the device is adapted, a multiple series of spaced knobs mounted on the disk, and all of said knobs projecting from and beyond the same side of the disk and disposed on the opposite side of the disk in relation to said third scaled dial, each series of knobs being aligned radially of the disk, and each series of knobs varying in the spaced relation of the knobs from the axis about which the disk is adapted to be actuated, a bracket fixed in relation to said axis and extending approximately radially of the disk and disposed at the side of the disk from which the knobs project, a series of electric contact switches carried by the bracket and aligned radially in relation to the disk and adapted to be engaged by the knobs in each of the series of knobs as the disk is moved about its axis, whereby various of the electric switches are actuated in various distinct combinations determined by the specific rows of radially aligned knobs as such rows of knobs are brought into position for contacting selected groupings of the electric switches, a series of separate electrical circuits each including one of said electric switches and a separate means to be electrically actuated in response to the inclusion and non-inclusion of said means in closed and open conditions of its respective electric circuit, a series of hydraulically operating control mechanisms, one such hydraulically operating control mechanism being provided for each electric switch, a variable pressure hydraulic circuit for each of said hydraulically operating control mechanisms adapted to operate upon a mechanism to be conditioned and actuated by pressure variations in its respective hydraulic circuit, each of said hydraulically operating control mechanisms comprising a sliding valve adapted for reciprocal movement for completing and for interrupting flow of fluid under pressure to separate mechanisms to be conditioned and actuated by fluid pressure, each valve comprising a housing and a valve stem projecting from opposite ends of the housing, a slide pin mounted for limited reciprocal motion and adapted for moving the valve in one direction, a solenoid included in circuit with one of said electric contact switches, a barrier operatively connected to the solenoid for movement by the solenoid, said barrier having a pair of apertures therein and adapted to be moved to and from positions aligning the said apertures alternately with the slide pin and with the one end of the valve stem and in the paths of reciprocation of said slide pin and valve stem, whereby one of said slide pin and valve stem members is aligned with one of said apertures and the other of said slide pin and valve stem members is positioned to contact against said barrier, when the barrier is in one position of its movement by the solenoid, and a vice versa relationship of said slide pin, valve stem barrier and apertures is effected when the barrier is moved to a second position of its movement by the solenoid, a single tree, a pair of pins each having an end pivotally connected with the opposite ends of the single tree, one of said pair of pins being in alignment with the valve stem and the other of said pair of pins being in alignment with said slide pin and each of said pair of pins being smaller in transverse dimension than the apertures in the barrier, whereby one of said pair of pins is adapted to be projected through the aperture in the barrier and make contact with the valve stem, and the other of said pair of pins is adapted to be projected through the second aperture in the barrier and make contact with the said slide pin, a bell crank lever having a fixed pivotal mounting and having one of its arms pivotally connected to the central portion of the single tree, a link adapted for reciprocal motion and along the length of which at spaced intervals the second arm of each bell crank lever is pivotally attached, and means for reciprocating the link, whereby the sliding valves are reciprocated to and from positions for completing and for interrupting flow of fluid under pressure, in response to and in accord with the selection of circuits opened and closed by the selected series of spaced knobs on the disk that are in contact actuating relation to the electric contact switches carried by the bracket.

5. A device as in claim 4 and means for yieldingly retaining the flat disk in various adjusted positions in relation to the bracket and the electric contact switches carried by the bracket.

6. A device as in claim 4, including means for yieldingly retaining the flat disk in various adjusted positions in relation to the bracket and the electric contact switches carried by the bracket, and a single means comprising separate hydraulically operating means for initiating operation of the common mechanical means and an electrical circuit and an electric switch adapted for operation from said single means for establishing open and closed electrical circuit conditions to and through the electric switches mounted on the bracket.

References Cited in the file of this patent

UNITED STATES PATENTS

| | | |
|---|---|---|
| 2,493,299 | Le Blond et al. | Jan. 3, 1950 |
| 2,641,938 | Kylin | June 16, 1953 |